United States Patent Office.

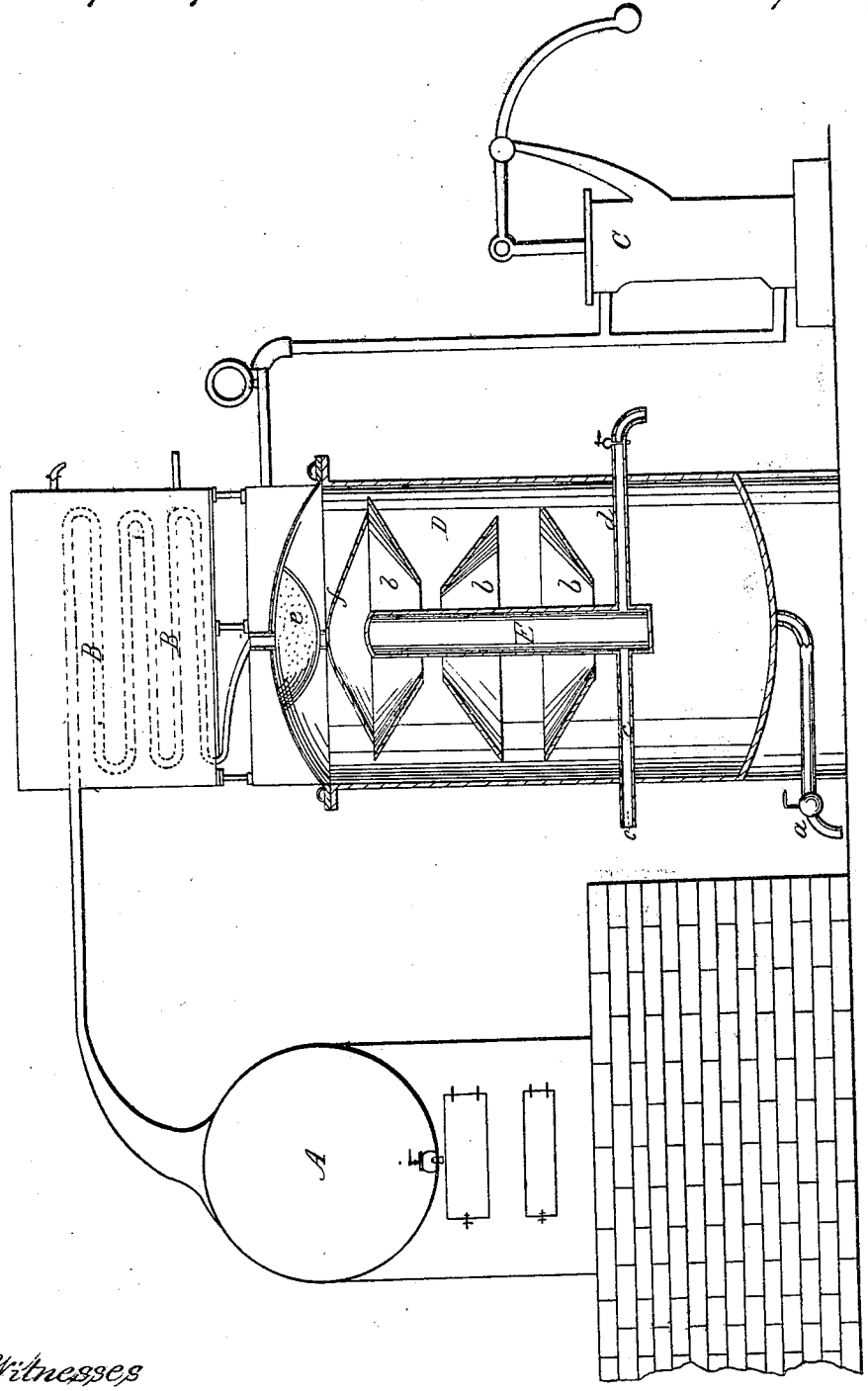

JOHN S. OLIVER AND EDWARD HARRIS, OF NEW YORK, N. Y.

Letters Patent No. 96,029, dated October 19, 1869.

---

IMPROVEMENT IN DISTILLING WHISKEY AND OTHER SPIRITS.

---

The Schedule referred to in these Letters Patent and making part of the same.

---

*To all whom it may concern:*

Be it known that we, JOHN S. OLIVER and EDWARD HARRIS, both of the city of New York, in the county and State of New York, have invented a new and useful Process for Distilling Whiskeys and other Spirituous Liquors; and we do hereby declare that the following is a full and exact description of the same.

The presence of fusel-oils, or of vapors holding in suspension such oils, is that which imparts to whiskeys and other spirituous liquors, all, or nearly all of their objectionable features; and hence the elimination of these deleterious elements, without further change of the liquor, or in any way altering its pure and wholesome quality, is necessary in order to improve it, as well as to render it innocuous as to its effects on the human system. It is well known, that in the mash as well as in high-wines, as at present distilled, there are certain baneful elements which vaporize only at a high temperature, such degree as is attained in the ordinary process of distilling. To effect the distillation of whiskeys and other spirituous liquors at a low temperature, so as to avoid the vaporization of these baneful elements, and to extract from the distilled liquor the noxious vapors or gases, is the object of this invention.

Our invention or process consists in the distilling of whiskey and other spirituous liquors in a vacuum, by means of an ordinary still heated by fire, a condenser, an air-pump, and a vacuum-receiving chamber, whereby we accomplish the above results; and it further consists in the combination, with such vacuum-chamber and the worm of a still, of one or more shelves, so arranged within said chamber, that the liquor is spread over a considerable surface before it becomes at rest in said chamber.

In carrying out our invention, it is, of course, desirable, if not necessary, to create a vacuum, not only in the still and worm, but also to provide a vacuum-chamber into which the liquor may run as it flows from the worm; and in this way a perfect vacuum may be maintained throughout the entire apparatus, by means of an exhaust-pump applied to the receiving-chamber, during the whole time occupied in distilling a given quantity of liquor; and the noxious vapors and the fusel-oil which may have escaped from the still, may be drawn off by said pump as the process of distillation progresses.

The accompanying drawing represents, in side elevation, a still and its worm or condensing-tubes, and an air-pump; and in longitudinal vertical section, the cooling-chamber through which the worm passes, and the vacuum-chamber for receiving the distilled liquor.

The still A, and its worm or condensing-tubes B, are of the ordinary construction, and the exhaust-pump C is also. The still A may be heated by fire, as illustrated in the drawing, or by steam, for instance, by a steam-worm or pipe, placed inside of the still, in the ordinary way.

The receiving-chamber D is an air-tight case, into which the worm of the still opens, and which is provided with a drawing-off faucet, *d*. And to such chamber the exhaust-pump C is attached. After the mash, or high-wine has been placed in the still and ready for distilling, a complete vacuum may be obtained through the entire apparatus, by means of the exhaust-pump, which pump not only exhausts the air, but draws off all the noxious vapors or gases which disengage themselves from the liquor as it falls from the worm to the bottom of the receiving-chamber. And we will here remark, that the receiving-chamber may be of various constructions, and answer the desired purpose.

In order to completely and effectually accomplish the disengagement, from the distilled liquor, of any noxious vapors or gases, which, perchance, may have been vaporized, a number of inclined shelves, *b b*, is arranged within the receiving-chamber D, in such manner that the liquor will run down each one successively, and thus be spread over a considerable surface, and fall in thin sheets, so that the gases, if any have been distilled over, may the more readily disengage themselves.

A drum, E, arranged centrally in the said chamber, and having a steam-pipe, *c*, let into it, and a drawing-off pipe, *d*, may, or may not be employed, as desired. When employed, its office will be to impart a low degree of heat to the liquor, and hence facilitate the disengagement of the gases.

At the top of the receiving-chamber, under the end of the worm, a rose or strainer, is employed; and under this, a concavo-convex plate *f*. The latter serves a similar purpose to the shelves *b b*.

Many important results are gained by our improved process, among which we will mention, First, the mash or liquid in the still vaporizes at a much lower temperature in a vacuum, and consequently the decomposition of certain deleterious elements which it contains, as for instance, the fusel-oils, and which, under a higher degree of temperature, would be vaporized, and impart injurious qualities to the liquor, is prevented.

Second, the most volatile portions are separated more perfectly from the less volatile, and the high-wines thus obtained are far more pure and of higher proof.

Third, the loss and injury to the liquor occasioned by the higher degree of heat employed in the ordinary process of distilling whiskeys, &c., are, by distilling *in vacuo*, entirely obviated.

Fourth, by the combination with the receiving-chamber, of shelves for spreading the liquor in thin sheets, any noxious gases which, perchance, may have escaped from the still, will the more readily disengage themselves.

We are aware that it is not new to distil oils in a vacuum; but the results accomplished thereby are totally different from distilling whiskeys and spirituous liquors. It is true, a less degree of heat is employed in both cases. In the former case, the reduction of the degree of heat is a great consideration, in view of the high degree necessary to volatilize oils; and by lowering the degree of heat, the burning of the oil is in a great measure prevented. In the latter case, different objects are sought, and important results are obtained, as we have hereinbefore stated, namely, the preventing of the decomposition or the vaporization of the fusel-oils in the mash or high-wines in the still.

What we claim as our invention, and desire to secure by Letters Patent, is—

1. The process of distilling whiskeys and other spirituous liquors *in vacuo*, by means of an ordinary still, heated by fire, or a steam coil-pipe, a worm or condenser, an exhaust-pump, and a vacuum-receiving chamber, substantially as herein specified.

2. The combination, with the worm or condensing-tubes, of a still, and with said vacuum-chamber, of one or more shelves, arranged within the said chamber, substantially as and for the purposes herein specified.

3. The combination of the still, its worm or condensing-tubes, the receiving-chamber, and the exhaust-pump, arranged and operating in substantially the manner herein described.

JOHN S. OLIVER.
EDWARD HARRIS.

Witnesses:
T. B. BEECHER,
M. M. LIVINGSTON.